Feb. 5, 1924.
S. TERRELL
1,482,770
LUGGAGE CARRIER FOR MOTOR VEHICLES
Filed July 26, 1922
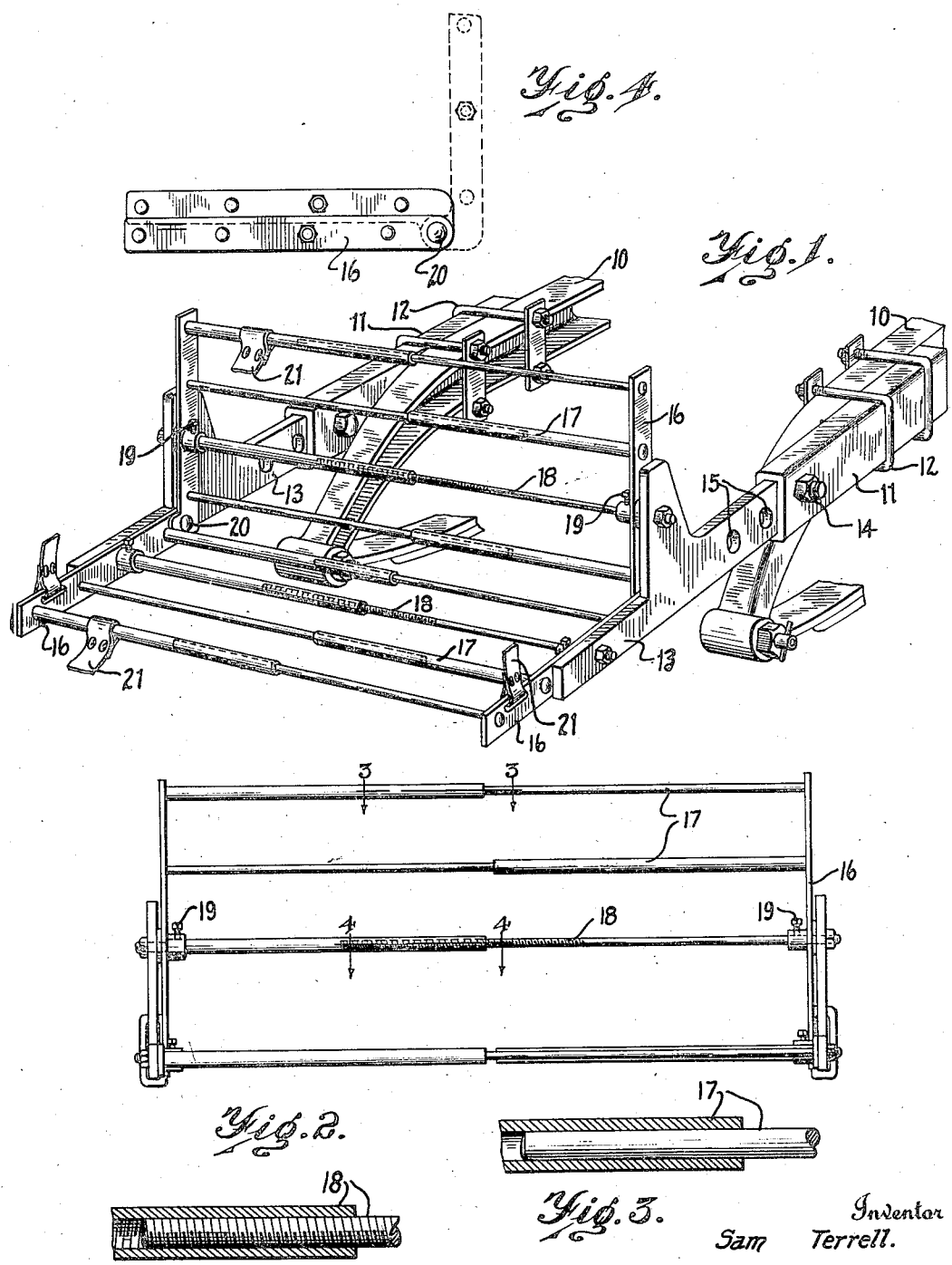
Inventor
Sam Terrell.
By Ralph J. Burton.
Attorney Patented Feb. 5, 1924.

1,482,770

UNITED STATES PATENT OFFICE.

SAM TERRELL, OF DETROIT, MICHIGAN, ASSIGNOR OF ONE-THIRD TO CHARLES B. JACKSON, OF DETROIT, MICHIGAN.

LUGGAGE CARRIER FOR MOTOR VEHICLES.

Application filed July 26, 1922. Serial No. 577,561.

*To all whom it may concern:*

Be it known that I, SAM TERRELL, citizen of the United States, residing at Detroit, county of Wayne, State of Michigan, have invented a certain new and useful Improvement in Luggage Carriers for Motor Vehicles, and declare the following to be a full, clear, and exact description of the same, such as will enable others skilled in the art to which it pertains to make and use the same, reference being had to the accompanying drawings, which form a part of this specification.

My invention relates to luggage carriers for motor vehicles.

The object is to provide a simple, durable and efficient luggage carrier adapted to be detachably secured to the rear end of any conventional type of automobile, and adjustable to different makes and widths of cars, and capable of supporting a trunk or other luggage.

A further object is to provide a luggage carrier for the rear end of a motor vehicle, which may be easily secured thereto to be carried thereby, and which is extensible rearwardly toward or away from the vehicle, and adjustable to accommodate varying widths of vehicle frames, and which is likewise adjustable to varying sizes of trunks.

The above and other objects, together with details of construction will more fully appear from the following description, appended claims and accompanying drawing, in which:

Fig. 1 is a perspective of the rear end frame of a car, with my carrier secured thereto, the car frame being broken away.

Fig. 2 is a rear end of elevation of my rack.

Fig. 3 is a fragmentary sectional view through one of the rack reach rods.

Fig. 4 is an end elevation of the pivoted end rack members.

Fig. 5 is a fragmentary sectional view through one of the frame reach rods.

In the drawing, let 10 indicate the side frame members of the vehicle. My luggage carrier consists of an independently adjustable trunk rack which is adjustably mounted between side members which side members are detachably secured to the side frame members of the vehicle.

I provide a pair of side members comprising each a tubular section 11, which is detachably secured to the side frame member 10 of the vehicle by means of clamps 12. Adjustable within, and telescopically carried by this tubular section 11 is a slide bar 13. This sliding bar 13 is provided with a plurality of spaced apart holes 15 through which extend bolts 14, which also extend through the tubular sections to hold the said bars at adjusted positions therein. Different makes of cars have different rear end constructions, and it is necessary that the luggage carrier rack be capable of adjustable movement toward or away from the rear end of the car, and through the use of this type of supporting means it is possible to move the rack toward or away from the end of the car.

My trunk rack proper is swung upon extensible reach rods 18, which intervene the slide bars 13, being threaded therein at opposite ends, which reach rods are formed in two sections, one section being threaded into the other for longitudinal adjustment. These reach rods brace the slide bars and serve as a mounting for the trunk rack. The trunk rack is freely, slidably mounted thereon, being held at any position to which adjusted on the reach rods 18.

The trunk rack proper comprises a bottom frame and a back frame, which frames comprise pivoted end sections 16, which are held in spaced apart relationship on the reach rods 18, by means of set screws 19, and which are provided with telescopic tubular cross members 17. The rack as is apparent from the drawing is adjustable in itself on the supporting reach rods 18, independently of the distance between the slide bars 13; and it is also adjustable to accommodate any width between said slide bars. The back and bottom section of the rack are pivoted together at 20, so that the one section may be folded down upon the other if it is so desired. Securing means in the form of straps 21 are provided, which in the drawing are broken away, which straps extend over a trunk carried by the rack to hold the same in place on the rack.

What I claim is:

1. In a motor vehicle having side frame members, a luggage carrier comprising a pair of longitudinally extensible side members adapted to be detachably secured to the side frame members of the vehicle to extend rearwardly thereof, said side members held in spaced apart relationship by transversely extending longitudinally-adjustable reach rods, a luggage rack supported on said reach rods comprising a bottom section and a back section, said rack adjustable lengthwise on said rods and provided with means for being releasably secured at adjusted positions thereto.

2. In a motor vehicle having side frame members, a luggage carrier having tubular side frame members, one adapted to be detachably secured to each side frame member of the vehicle to extend rearwardly thereof, slide bars telescopically mounted in said tubular side members for withdrawal rearwardly thereof and adapted to be secured thereto at a plurality of adjusted positions, longitudinally adjustable reach rods extending between said slide bars to permit varying the distance therebetween, a luggage rack having end sections mounted on said reach rods for relative adjustment lengthwise thereof, the said end sections connected together by telescoping crossed members to permit adjustment relative each other, said end sections provided with means for releasably fastening the same to the reach rods at various adjusted positions.

In testimony whereof, I sign this specification.

SAM TERRELL.